United States Patent
Wei et al.

(10) Patent No.: US 10,106,059 B2
(45) Date of Patent: Oct. 23, 2018

(54) HARMONIC DRIVE DISC RECLINER FOR AUTOMOTIVE VEHICLE SEAT

(71) Applicant: Magna Seating Inc, Aurora (CA)

(72) Inventors: Xiao J Wei, Canton, MI (US); Ronald A Zimmerman, White Lake, MI (US)

(73) Assignee: Magna Seating Inc, Aurora, Ontario (CA)

( * ) Notice: Subject to any disclaimer, the term of this patent is extended or adjusted under 35 U.S.C. 154(b) by 0 days.

(21) Appl. No.: 15/512,076

(22) PCT Filed: Sep. 18, 2015

(86) PCT No.: PCT/US2015/050973
§ 371 (c)(1),
(2) Date: Mar. 17, 2017

(87) PCT Pub. No.: WO2016/044743
PCT Pub. Date: Mar. 24, 2016

(65) Prior Publication Data
US 2017/0253150 A1    Sep. 7, 2017

Related U.S. Application Data

(60) Provisional application No. 62/052,633, filed on Sep. 19, 2014.

(51) Int. Cl.
  *B60N 2/20* (2006.01)
  *B60N 2/22* (2006.01)
  (Continued)

(52) U.S. Cl.
  CPC ......... *B60N 2/2252* (2013.01); *F16H 49/001* (2013.01); *F16H 2049/006* (2013.01)

(58) Field of Classification Search
  CPC ................. B60N 2/2252; F16H 49/001; F16H 2049/006
  (Continued)

(56) References Cited

U.S. PATENT DOCUMENTS

| 9,327,618 B2* | 5/2016 | Villarroel .............. F16H 49/001 |
| 2008/0061616 A1* | 3/2008 | Wahls .................. B60N 2/2252 |
| | | 297/362 |

(Continued)

FOREIGN PATENT DOCUMENTS

| FR | 2560832 | 9/1985 |
| WO | 20050101622 | 10/2005 |

(Continued)

*Primary Examiner* — Rodney B White
(74) *Attorney, Agent, or Firm* — Miller Canfield (57) ABSTRACT

A disc recliner 18 for a seat assembly includes a fixed plate 22 secured to a seat cushion 12 and a rotatable plate 30 secured to a seat back 14. Each of the fixed and rotatable plates 22,30 has a plurality of teeth 40,48, the number of teeth not being equal. A flex spline 26 has a plurality of teeth 52, the number of teeth being equal to the number of teeth on the fixed plate 22. A wave generator 28 causes a portion of the teeth 52 on the flex spline 26 to meshingly engage with the teeth 40,48 on the fixed and rotatable plates 22,30. Rotation of the wave generator 28 causes the teeth 52 on the flex spline 26 which meshingly engage with the teeth 40,48 on the fixed and rotatable plates 22,30 to change, thereby causing the rotatable plate 30 to rotate relative to the fixed plate 22, which in turn causes the seat back 14 to pivot relative to the seat cushion 12.

20 Claims, 6 Drawing Sheets (51) Int. Cl.
*B60N 2/225* (2006.01)
*F16H 49/00* (2006.01)

(58) Field of Classification Search
USPC .......................................................... 297/362
See application file for complete search history.

(56) References Cited

U.S. PATENT DOCUMENTS

2016/0258522 A1* 9/2016 Hofmann .............. F16H 49/001
2017/0051820 A1* 2/2017 Huang ................ F16H 57/0427

FOREIGN PATENT DOCUMENTS

| WO | 20070011256 | 1/2007 |
| WO | 20120162802 | 12/2012 |
| WO | 20130011218 | 1/2013 |

\* cited by examiner

ID_RECLINER FOR
AUTOMOTIVE VEHICLE SEAT

CROSS-REFERENCE TO RELATED
APPLICATIONS

This application claims priority to and all the benefits of United States Provisional Application No. 62/052,633 filed on Sep. 19, 2014 and entitled "Harmonic Drive Disc Recliner for Automotive Vehicle Seat".

BACKGROUND OF THE INVENTION

1. Field of the Invention

The present invention relates to a vehicle seat assembly. More particularly, the present invention relates to a harmonic drive disc recliner operatively coupling a seat back and a seat cushion of a vehicle seat assembly.

2. Description of Related Art

Automotive vehicles typically include one or more seat assemblies having a seat cushion and a seat back for supporting passengers above a vehicle floor. The seat assembly is commonly mounted directly to the vehicle floor or, more commonly, the seat assembly is operatively coupled to the floor by a seat track assembly for providing fore and aft sliding adjustment of the seat assembly for passenger comfort. The seat back is typically operatively coupled to the seat cushion by a recliner assembly for providing pivotal movement relative to the seat cushion.

For some vehicles, particularly those for the luxury market, the recliner assembly is electrically powered. A typical power seat recliner assembly includes an electric drive motor that meshes with a series of reduction gears. Rotation of the drive motor adjusts the recline angle of the seat back relative to the seat cushion. Forward and rearward reclining movement of the seat back is provided through reversing the direction of rotation of the drive motor.

It is desirable that an improved recliner assembly be compact, lightweight and low-cost. It is also desirable that an improved recliner assembly reduce any gear backlash or "chuck." "Chuck" refers to any imperfection or play within the recliner assembly that allows unintended movement of the seat back while the recliner assembly is in a locked condition. Further, it is desirable that an improved recliner assembly allows for a high gear ratio which allows for a smaller drive motor and less drive motor gear reduction.

SUMMARY OF THE INVENTION

According to one aspect of the invention, a seat assembly for an automotive vehicle includes a harmonic drive disc recliner operatively coupling a seat back to a seat cushion to allow pivotal movement of the seat back relative to the seat cushion. The disc recliner includes a fixed plate secured to the seat cushion and a rotatable plate secured to the seat back and rotatably coupled to the fixed plate. The fixed and rotatable plates each have a plurality of teeth disposed therearound that extend radially inward. The number of teeth on the fixed plate does not equal the number of teeth on the rotatable plate. A flex spline is disposed between the fixed and rotatable plates and includes a plurality of teeth that extend radially outward. The flex spline has the same number of teeth as the fixed plate. A wave generator is disposed within the flex spline and has an outer profile with lobes that cause the teeth on the flex spline to meshingly engage with the teeth on the fixed and rotatable plates in distinct regions corresponding with the lobes. As the wave generator rotates, the regions where the teeth on the flex spline meshingly engage with the teeth on the fixed and rotatable plates change and simultaneously the teeth on the flex spline urge the teeth on the rotatable plate to align with the teeth on the fixed plate in those regions, thereby causing rotation of the rotatable plate relative to the fixed plate, which in turn causes the seat back to pivot relative to the seat cushion.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF THE
EMBODIMENTS

Figure 1:
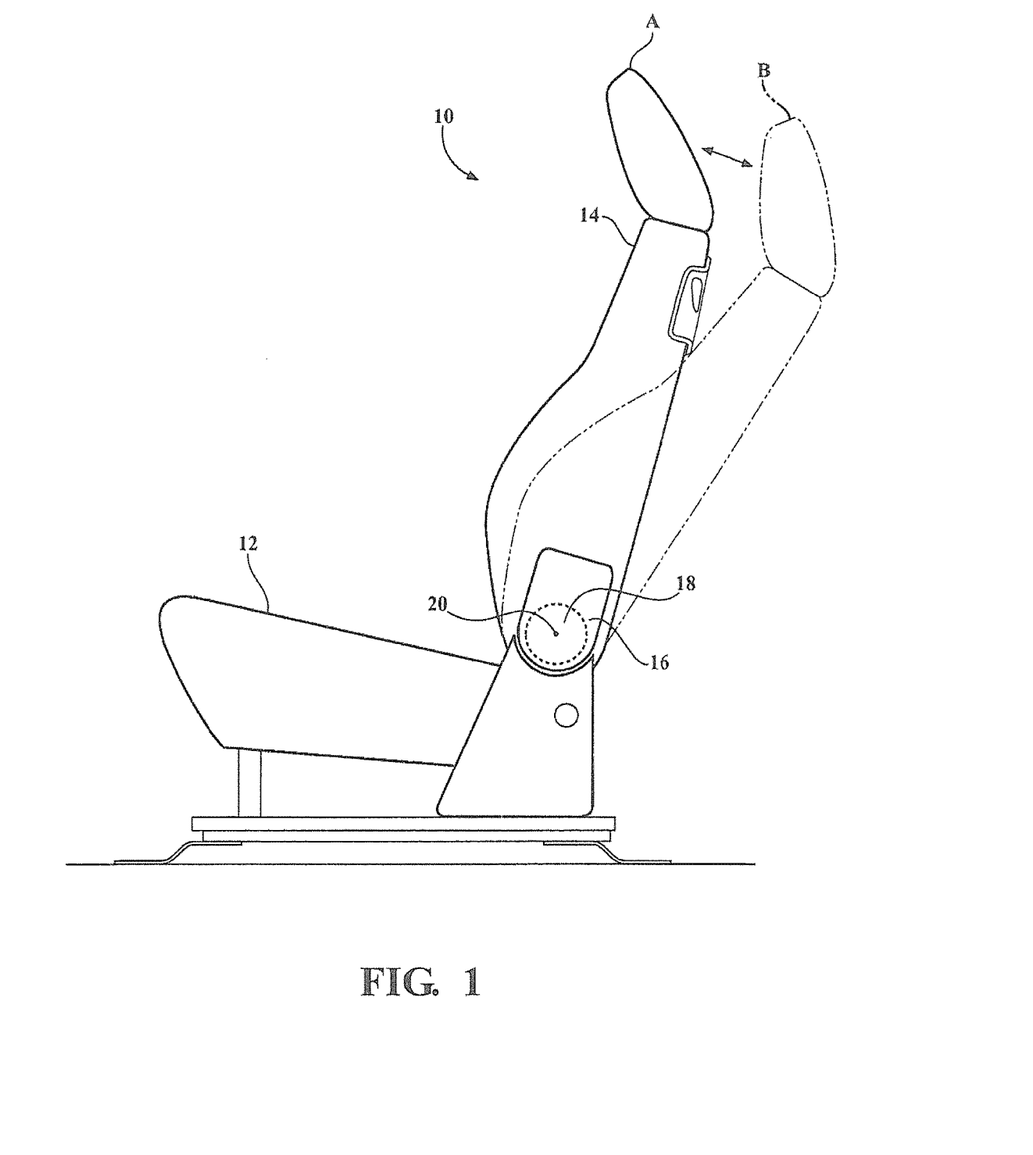
FIG. 1 is a side view of a vehicle seat assembly including a seat back operatively coupled to a seat cushion with a recliner assembly having a harmonic drive disc recliner.

Referring to the Figures, wherein like numerals indicate like or corresponding parts throughout the several views, a seat assembly for use in an automotive vehicle is generally shown at 10 in FIG. 1. The seat assembly 10 includes a generally horizontal seat cushion 12 and a generally upright seat back 14 operatively coupled by a recliner assembly 16 to the seat cushion 12. The recliner assembly 16 includes a pair of spaced apart and synchronized disc recliners 18, only one of which is shown.

Referring to FIGS. 1 through 4, the disc recliners 18 allow for pivotal or angular adjustment of the seat back 14 relative to the seat cushion 12 about a pivot axis 20 that extends laterally or in an axial direction. The seat back 14 is adjustable between an upright seating position, shown at A, and a plurality of reclined positions disposed rearwardly of the upright seating position A, one of which is shown at B. Only one of the disc recliners 18 will be described in detail, however, it is contemplated that both of the disc recliners 18 may have generally the same construction. The disc recliner 18 generally includes a fixed plate 22, an input shaft 24, a flex spline 26, a wave generator 28, and a rotatable plate 30. In the current embodiment, the fixed plate 22 is adapted to be mounted to the seat cushion 12 and the rotatable plate 30 is adapted to be mounted to the seat back 14. The fixed plate 22 and the rotatable plate 30 are held together by a retaining ring (not shown) in a manner well known in the art such that the rotatable plate 30 can rotate about the pivot axis 20 relative to the fixed plate 22. It is understood that rotation of the rotatable plate 30 relative to the fixed plate 22 results in pivotal movement of the seat back 14 relative to the seat cushion 12.

Figure 2:
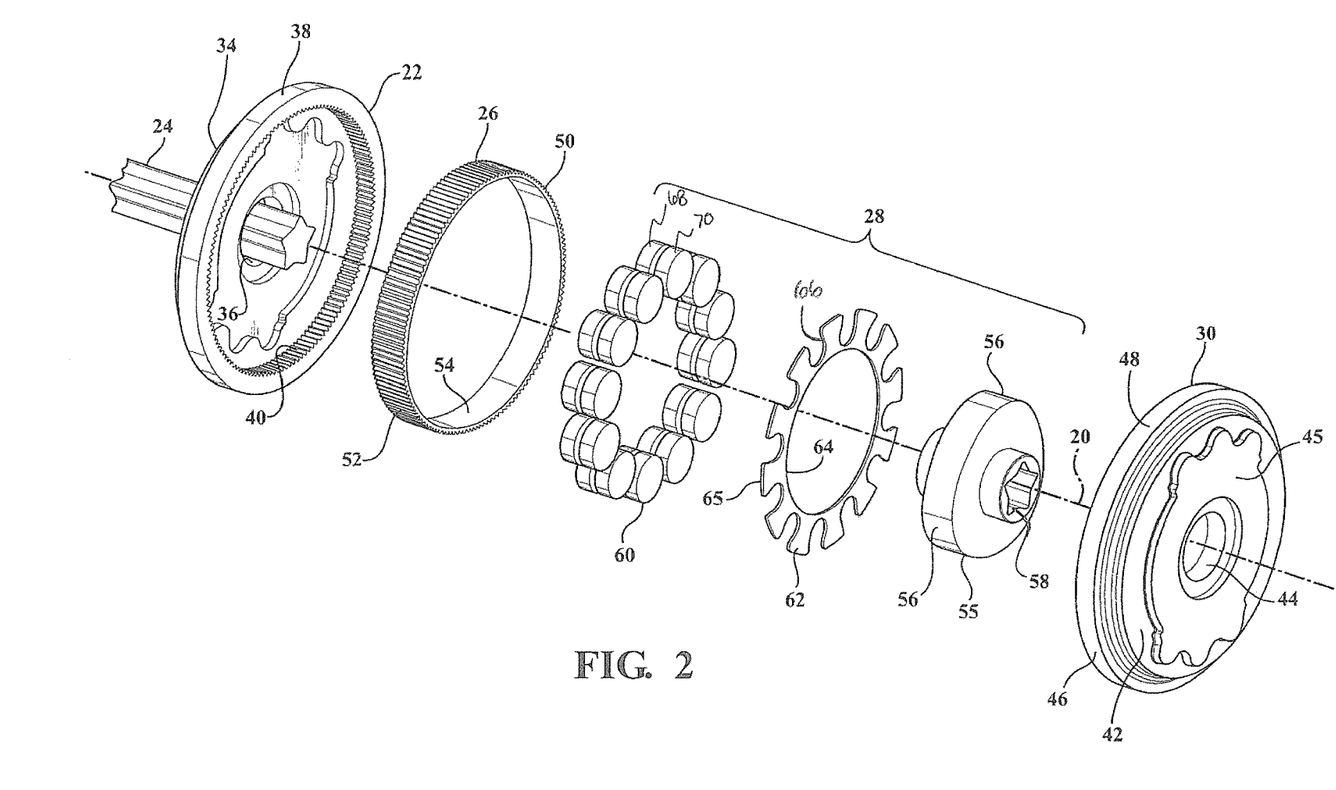
FIG. 2 is an exploded perspective view of a harmonic drive disc recliner according to a first embodiment of the invention.

The fixed plate 22 is circular, generally cup-shaped, and includes an end wall 34 having a first central bore 36 extending therethrough in the axial direction. When the disc recliner 18 is assembled, the first central bore 36 is coaxial with the pivot axis 20. An outer side of the end wall 34 is adapted to be fixedly secured to the seat cushion 12 by any suitable means. A side wall 38 protrudes from the end wall 34 in the axial direction and extends circumferentially around the fixed plate 22 to define an inner perimeter surface. A first plurality of teeth 40 is disposed around the inner surface of the side wall 38. The teeth 40 extend radially inward toward the pivot axis 20.

The rotatable plate 30 is also circular, generally cup-shaped, and includes an end wall 42 having a second central bore 44 extending therethrough in the axial direction. When the disc recliner 18 is assembled, the second central bore 44 is coaxial with the pivot axis 20. An outer side 45 of the end wall 42 is adapted to be fixedly secured to the seat back 14 by any suitable means. A side wall 46 protrudes from the end wall 42 in the axial direction and extends circumferentially around the rotatable plate 30 to define an inner perimeter surface. A second plurality of teeth 48 is disposed around the inner surface of the side wall 46. The teeth 48 extend radially inward toward the pivot axis 20.

The flex spline 26 is ring-shaped and has a thin flexible wall 50. A third plurality of teeth 52 is disposed around an outside surface of the flexible wall 50 opposite an inner surface 54. The teeth 52 extend radially outward away from the pivot axis 20. The flex spline 26 is disposed in the axial direction between the fixed plate 22 and the rotatable plate 30 such that the teeth 52 on the flex spline 26 meshingly engage with the teeth 40 on the fixed plate 22 and the teeth 48 on the rotatable plate 30, as will be described in further detail below.

Figure 3:
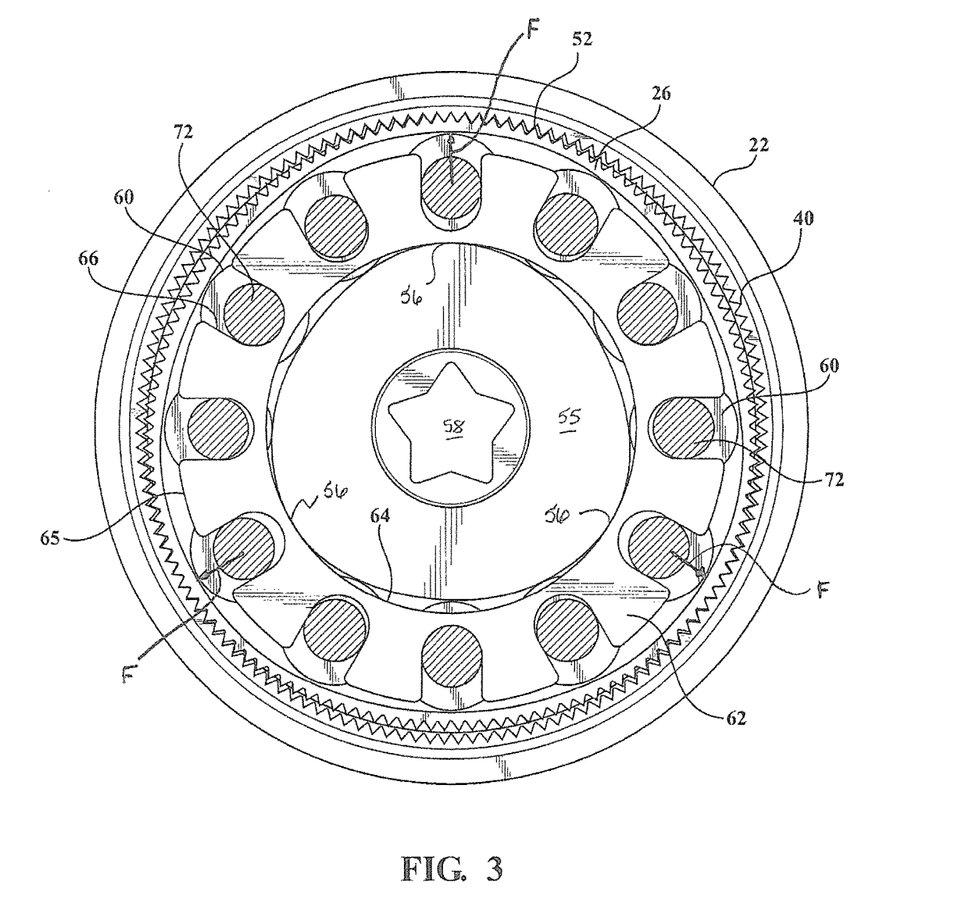
FIG. 3 is a side view of the disc recliner shown in FIG. 2 illustrating a wave generator causing meshing engagement between a flex spline, fixed plate, and rotatable plate.

The wave generator 28 is disposed circumferentially within the flex spline 26 and includes an outer profile that is adapted for engaging the inner surface 54 of the flex spline 26 thereby deforming the flex spline 26 and causing the teeth 52 on the flex spline 26 to meshingly engage with the teeth 40 on the fixed plate 22 and the teeth 48 on the rotatable plate 30 in distinct regions. Each region where the teeth 52 on the flex spline 26 meshingly engage with the teeth 40 on the fixed plate 22 and the teeth 48 on the rotatable plate 30 corresponds with a lobe or high point on the outer profile of the wave generator 28.

Figure 4:
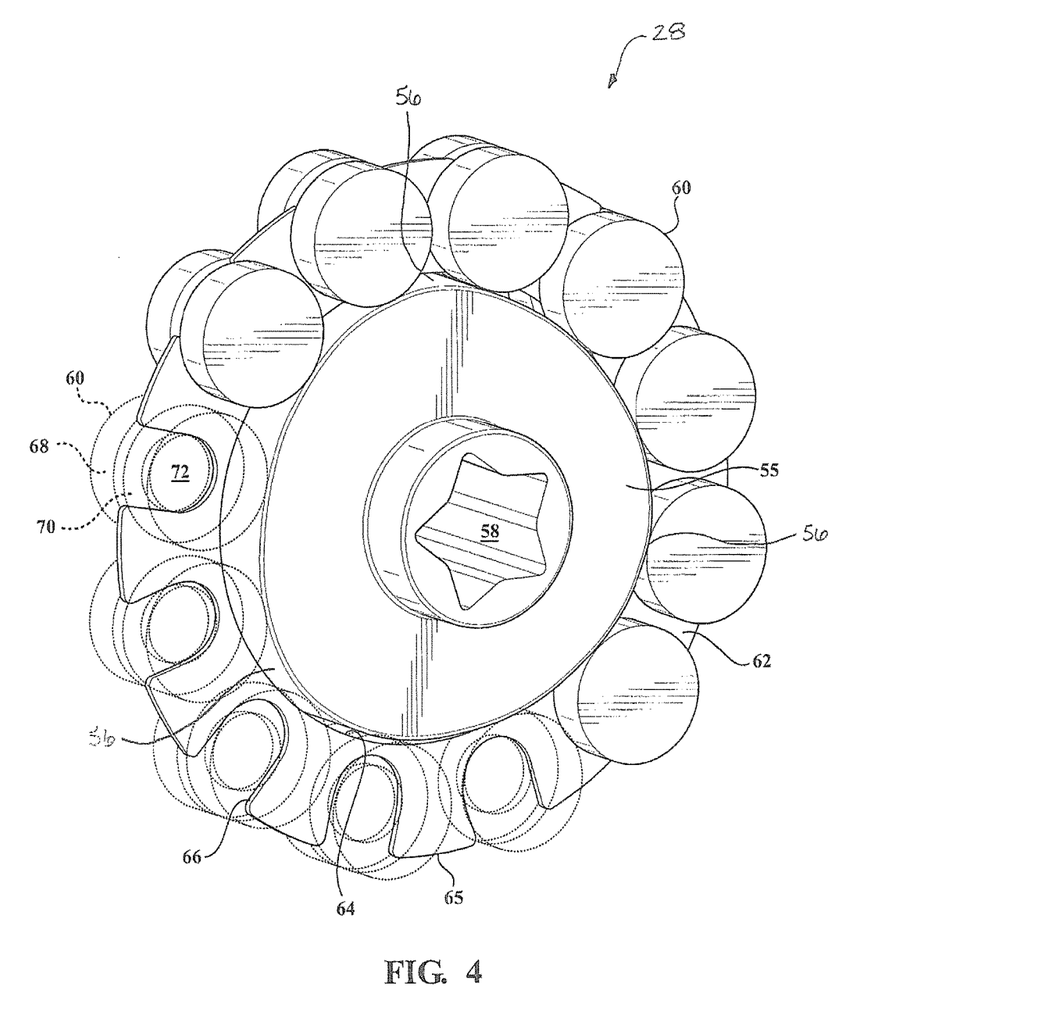
FIG. 4 is a fragmentary perspective view of the wave generator shown in FIG. 3.

In the current embodiment, the wave generator 28 includes a disc-shaped cam 55 having an outer profile defining three lobes 56 generally equally spaced apart in the circumferential direction. Thus, each lobe 56 is spaced approximately one hundred and twenty (120) degrees apart from each adjacent lobe 56. The wave generator 28 further includes a plurality of rollers 60 spaced apart around the perimeter of the cam 55. The wave generator 28 further includes a disc-shaped cage 62 seated between the cam 55 and the flex spline 26 for supporting the rollers 60 around the perimeter of the cam 55. The cage 62 includes an inner rim 64 and an opposite outer rim 65 having a plurality of spaced apart U-shaped recesses 66 formed therein opposite the inner rim 64 for rotatable and slidably receiving and supporting the plurality of rollers 60. More specifically, each roller 60 is disposed in a recess 66 formed in the outer profile of the cage 62. Each roller 60 includes spaced apart first and second wheels 68, 70 mounted on opposite ends of a spacer or shaft 72 that extends in the axial direction. The first and second wheels 68, 70 are disposed on opposite sides of the cage 62 and the shaft 72 is rotatably supported in the recess 66. The axis of each shaft 72 is generally parallel with the pivot axis 20. The rollers 60 are sized such that the outer peripheral roller surface of each roller 60 extends radially past both the inner rim 64 and outer rim 65 of the cage 62 such that the rollers 60 contact the inner surface 54 of the flex spline 26 and the lobes 56 of the cam 55. That is, as the cam 55 rotates, the lobes 56 engage one or more rollers 60 which in turn contact with the inner surface 54 of the flex spline 26. The rollers 60 are also in rolling contact with the inner surface 54 of the flex spline 26, thereby reducing the friction between the wave generator 28 and the flex spline 26 while also ensuring the teeth 52 on the flex spline 26 remain meshingly engaged with the teeth 40, 48 on the fixed and rotatable plates 22, 30.

Each lobe 56 of the wave generator creates contact between one or more rollers 60 with the inner surface 54 of the flex spline 26 and applies a normal force F thereto, thereby deforming the shape of the flex spline 26. That is, rotation of the wave generator 28 causes the flex spline 26 to deform to the shape of the rotating wave generator 28. The flex spline 26 does not rotate with the wave generator 28, the reason for which is described below. Rather, as the cam 55 rotates, each of the cam lobes 56 engage one or more of the rollers 60 forcing the rollers 60 to slide radially outward along the recesses 66 in the cage 62 and into engagement with the inner surface 54 of the flex spline 26 deforming the shape of the flex spline 26 to correspond with the shape of the corresponding cam lobe 56.

The wave generator 28 also includes a third central bore 58 extending therethrough in the axial direction and which is adapted for receiving the input shaft 24. When the disc recliner 18 is assembled, the third central bore 58 is coaxial with the pivot axis 20. It is contemplated that the cam 55 of the wave generator 28 could have more than three lobes 56 causing the teeth 52 on the flex spline 26 to meshingly engage with the teeth 40 on the fixed plate 22 and the teeth 48 on the rotatable plate 30 in more than three regions.

The input shaft 24 is coaxial with the pivot axis 20 and extends in the axial direction through the first central bore 36 of the fixed plate 22, the third central bore 58 of the wave generator 28, and the second central bore 44 of the rotatable plate 30. The input shaft 24 is rotatably driven by a motor (not shown) in a first or second direction depending on the desired direction of movement of the seat back 14. Alternatively, it is appreciated that the input shaft 24 may be manually rotated in the first or second direction without varying from the scope of the invention. The wave generator 28 is coupled to the input shaft 24 for rotation therewith. As the wave generator 28 rotates, the teeth 52 on the flex spline 26 which meshingly engage with the teeth 40, 48 on the fixed and rotatable plates 22, 30 changes. In other words, the regions where the teeth 52 on the flex spline 26 meshingly engage with the teeth 40, 48 on the fixed and rotatable plates 22, 30 change and revolve around the pivot axis 20 at the same rate as rotation of the wave generator 28.

In the current embodiment, the number of teeth 52 or tooth count on the flex spline 26 is equal to the number of teeth 40 or tooth count on the fixed plate 22. For example, the number of teeth 52 on the flex spline 26 and the number of teeth 40 on the fixed plate 22 is one hundred and eighty (180). Since the flex spline 26 and the fixed plate 22 have the same number of teeth there is no relative rotation between the flex spline 26 and the fixed plate 22 during rotation of the wave generator 28. Rather, the teeth 52 on the flex spline 26 simply engage and disengage with the teeth 40 on the fixed plate 22 as the wave generator 28 rotates, thereby causing the flex spline 26 to flex inwardly and outwardly. In contrast, the rotatable plate 30 has more teeth than the flex spline 26.

In one embodiment, for example, the number of teeth 48 or tooth count on the rotatable plate 30 is one hundred and eighty-three (183). Since the rotatable plate 30 has more teeth than the flex spline 26, the rotatable plate 30 will rotate relative to the flex spline 26 during rotation of the wave generator 28. More specifically, the different number of teeth results in a misalignment between a profile of the teeth 48 on the rotatable plate 30 and a profile of the teeth 40 on the fixed plate 22. Thus, as the wave generator 28 causes the flex spline 26 to flex outwardly, the teeth 52 on the flex spline 26 push against the teeth 48 on the rotatable plate 30 to align the profile of the teeth 48 on the rotatable plate 30 with the profile of the teeth 40 on the fixed plate 22 in the regions where the teeth 52 on the flex spline 26 meshingly engage with the teeth 40, 48 on the fixed and rotatable plates 22, 30, thereby causing the rotatable plate 30 to rotate relative to the flex spline 26 and the fixed plate 22.

For every full rotation of the wave generator 28, the rotatable plate 30 will rotate a slight amount (three teeth, for example) backward relative to the flex spline 26. The reduction ratio from the input shaft 24 to the rotatable plate 30 can be calculated as:

$$\text{reduction ratio} = \frac{\text{number of teeth on flex spline} - \text{number of teeth on rotatable plate}}{\text{number of teeth on flex spline}}$$

For example, if the number of teeth 48 on the rotatable plate 30 is one hundred and eighty-three (183) and the number of teeth 52 on the flex spline 26 is one hundred and eighty (180), the reduction ratio is −0.0167. Thus, the rotatable plate 30 will rotate at $\frac{1}{60}^{th}$ the speed of the input shaft 24 and in the opposite direction. It is appreciated that the difference between the number of teeth 48 on the rotatable plate 30 and the number of teeth 52 on the flex spline 26 will depend on the number of regions in which the teeth 52 on the flex spline 26 meshingly engage with the teeth 48 on the rotatable plate 30.

Figure 5:
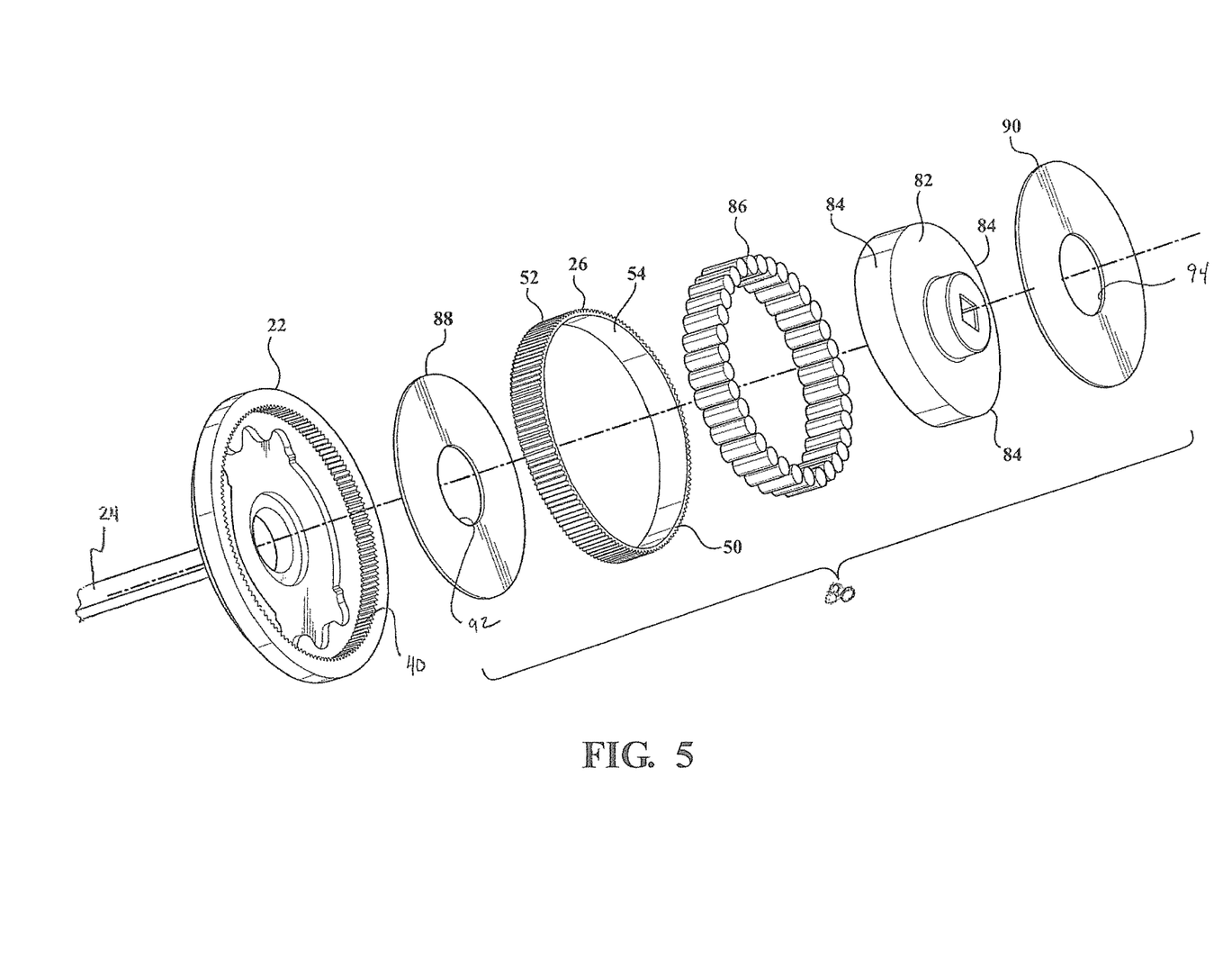
FIG. 5 is an exploded perspective view of a harmonic drive disc recliner according to a second embodiment of the invention.
Figure 6:
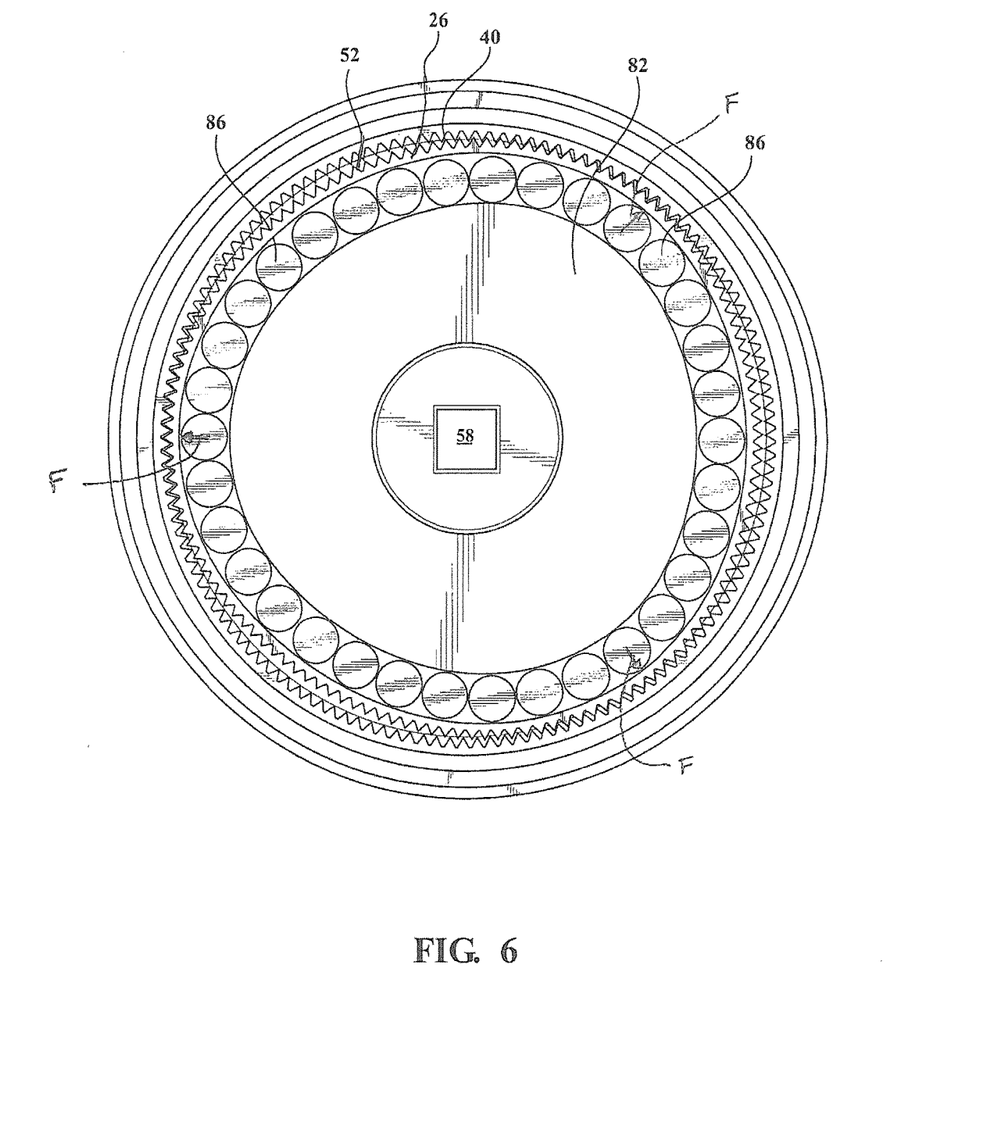
FIG. 6 is a side view of the disc recliner shown in FIG. 5 illustrating a wave generator causing meshing engagement between a flex spline, fixed plate, and rotatable plate.

Referring to FIGS. 5 and 6, an alternative embodiment of a wave generator is shown at 80. The wave generator 80 similarly includes a disc-shaped cam 82 having an outer profile defining three lobes 84 generally equally spaced apart in the circumferential direction. Thus, each lobe 84 is spaced approximately one hundred and twenty (120) degrees apart from each adjacent lobe 84. The wave generator 80 further includes a plurality of rollers 86 around the perimeter of the cam 82. The wave generator 80 further includes a pair of disc-shaped roller bearing plates 88, 90 seated on each opposite axial end of the rollers 86 for supporting the rollers 86 axially therebetween. Each roller bearing plate 88, 90 includes an axial bore 92, 94 for receiving the input shaft 24 axially therethrough. The plurality of rollers 86 are seated circumferentially around the outer profile of the cam 82 and radially between the cam 82 and the flex spline 26. As the cam 82 rotates, the lobes 84 engage one or more rollers 86 which in turn contact with the inner surface 54 of the flex spline 26. The rollers 86 are also in rolling contact with the inner surface 54 of the flex spline 26, thereby reducing the friction between the wave generator 80 and the flex spline 26 while also ensuring the teeth 52 on the flex spline 26 remain meshingly engaged with the teeth 40, 48 on the fixed and rotatable plates 22, 30.

Each lobe 84 of the cam 82 creates contact between one or more rollers 86 with the inner surface 54 of the flex spline 26 and applies a normal force F thereto, thereby deforming the shape of the flex spline 26. That is, rotation of the wave generator 80 causes the flex spline 26 to deform to the shape of the rotating wave generator 80. The flex spline 26 does not rotate with the wave generator 80. Rather, as the cam 82 rotates, each of the cam lobes 84 engage one or more of the rollers 86 forcing the rollers 86 into engagement with the inner surface 54 of the flex spline 26 and deforming the shape of the flex spline 26 to correspond with the shape of the corresponding cam lobe 84. Again, as in the first embodiment, as the wave generator 80 causes the flex spline 26 to flex outwardly, the teeth 52 on the flex spline 26 push against the teeth 48 on the rotatable plate 30 to align the profile of the teeth 48 on the rotatable plate 30 with the profile of the teeth 40 on the fixed plate 22 in the regions where the teeth 52 on the flex spline 26 meshingly engage with the teeth 40, 48 on the fixed and rotatable plates 22, 30, thereby causing the rotatable plate 30 to rotate relative to the flex spline 26 and the fixed plate 22.

The invention has been described in an illustrative manner, and it is to be understood that the terminology, which has been used, is intended to be in the nature of words of description rather than of limitation. Many modifications and variations of the present invention are possible in light of the above teachings. It is, therefore, to be understood that within the scope of the appended claims, the invention may be practiced other than as specifically described.

What is claimed:

1. A disc recliner operatively coupling a seat back to a seat cushion to allow selective pivotal movement of the seat back relative to the seat cushion about a pivot axis extending in an axial direction, said disc recliner comprising:
    a first plate adapted to be fixedly secured to the seat cushion, said first plate including a first plurality of teeth disposed therearound;
    a second plate adapted to be fixedly secured to the seat back and rotatably coupled to said first plate, said second plate including a second plurality of teeth disposed therearound, wherein a tooth count of said first plurality of teeth does not equal a tooth count of said second plurality of teeth;
    a flex spline including a flexible wall having a third plurality of teeth disposed therearound, wherein a tooth count of said third plurality of teeth equals said tooth count of said first plurality of teeth; and
    a wave generator having an outer profile causing a portion of said third plurality of teeth to meshingly engage with said first plurality of teeth and said second plurality of teeth;
    wherein said wave generator includes:
        a cam having a plurality of spaced apart lobes extending outwardly in a radial direction defining a cam outer profile;
        a disc-shaped cage having an inner defining an opening for receiving the cam, an opposite outer rim having a plurality of spaced apart U-shaped recesses formed therein opposite said inner rim and extending around the perimeter of said cage; and
        a plurality of rollers rotatably and slidably received in and supported by said plurality of U-shaped recesses, said plurality of rollers repositionable within said plurality of U-shaped recesses towards the flex spline by direct contact with said plurality of spaced apart lobes;
        wherein rotation of said cam aligns said plurality of lobes with one or more of said plurality of rollers, said one of more of said plurality of rollers repositioned towards said flex spline for direct contact between said plurality of rollers and said flexible wall of said flex spline for forcing said third plurality of teeth of said flex spline to meshingly engage with said first and second plurality of teeth;

wherein said second plate rotates relative to said first plate, thereby causing pivotal movement of said seat back relative to said seat cushion in response to rotation of said wave generator.

2. The disc recliner as set forth in claim 1 wherein said plurality of lobes are generally equally spaced apart in circumferential direction of said outer profile, said plurality of lobes causing at least one of the plurality of rollers to be repositioned within a respective said U-shaped recess such that the at least one of the plurality of rollers is in direct contact with the flex spline for forcing said third plurality of teeth to meshingly engage with said first plurality of teeth and said second plurality of teeth in a plurality of distinct regions corresponding with said plurality of lobes.

3. The disc recliner as set forth in claim 2 wherein said distinct regions at which said third plurality of teeth meshingly engage said first and second plurality of teeth changes in response to rotation of said wave generator.

4. The disc recliner as set forth in claim 2 wherein said third plurality of teeth urge said second plurality of teeth to align with said first plurality of teeth in said plurality of distinct regions in response to rotation of said wave generator, thereby causing said rotation of said second plate relative to said first plate.

5. The disc recliner as set forth in claim 1 wherein said flex spline does not rotate relative to said first plate in response to rotation of said wave generator.

6. The disc recliner as set forth in claim 1 wherein said first plate is circular and said first plurality of teeth extend radially inwardly toward said pivot axis, and wherein said second plate is circular and said second plurality of teeth extending radially inward toward said pivot axis, and wherein said flex spline is circular and disposed axially between said first and second plates and wherein said third plurality of teeth extend radially outwardly away from said pivot axis for meshed engagement with said first and second plurality of teeth.

7. The disc recliner as set forth in claim 1 further including an input shaft coaxial with said pivot axis, said input shaft coupled to said wave generator for rotating said wave generator about said pivot axis.

8. The disc recliner as set forth in claim 1 wherein each of said plurality of rollers includes first and second wheels spaced apart in the axial direction and interconnected by a shaft, said shaft having an axis generally parallel to said pivot axis and rotatably supported in a respective said U-shaped recess.

9. The disc recliner as set forth in claim 8 wherein said shaft is slidably and rotatably supported in the respective said U-shaped recess of said cage to allow each of said wheels to maintain direct contact between said outer profile of said cam and said flexible wall of said flex spline.

10. The disc recliner as set forth in claim 1 wherein said wave generator further includes a pair of disc-shaped roller bearing plates seated on each opposite axial end of said plurality of rollers for supporting said plurality of rollers axially therebetween while allowing said plurality of rollers to rotate and move radially and thereby maintain contact between said outer profile of said cam and said flexible wall of said flex spline.

11. A seat assembly for an automotive vehicle, the seat assembly comprising a seat back, a seat cushion, and a disc recliner operatively coupling the seat back to the seat cushion to allow selective pivotal movement of the seat back relative to the seat cushion about a pivot axis extending in an axial direction, the disc recliner comprising:

a first plate adapted to be fixedly secured to the seat cushion, the first plate including a first plurality of teeth disposed therearound;

a second plate adapted to be fixedly secured to the seat back and rotatably coupled to the first plate, the second plate including a second plurality of teeth disposed therearound, wherein a tooth count of the first plurality of teeth does not equal a tooth count of the second plurality of teeth;

a flex spline including a flexible wall having a third plurality of teeth disposed therearound, wherein a tooth count of the third plurality of teeth equals the tooth count of the first plurality of teeth;

a wave generator having a rotatable cam, a disc-shaped cage, and a plurality of rollers;

the cam having a plurality of spaced apart lobes extending outwardly in a radial direction defining a cam outer profile;

the disc-shaped cage having an inner rim defining an opening for receiving the cam, an opposite outer rim having a plurality of spaced apart U-shaped recesses formed therein opposite the inner rim and extending around the perimeter of the cage; and the plurality of rollers rotatably and slidably received in and supported by the plurality of U-shaped recesses;

wherein alignment of a lobe of the plurality of lobes with a roller of the plurality of rollers repositions the roller within a respective U-shaped recess towards the flex spline, the repositioned roller being in direct contact with the flexible wall of the flex spline forcing a portion of the third plurality of teeth of the flex spline to meshingly engage with the first and second plurality of teeth; and wherein the second plate rotates relative to the first plate, thereby causing pivotal movement of the seat back relative to the seat cushion in response to rotation of the wave generator.

12. The seat assembly of claim 11, wherein the plurality of lobes are generally equally spaced apart in circumferential direction of the cam outer profile, the plurality of lobes causing the third plurality of teeth to meshingly engage with the first plurality of teeth and the second plurality of teeth in a plurality of distinct regions corresponding with the plurality of lobes.

13. The seat assembly of claim 12, wherein the plurality of distinct regions at which the third plurality of teeth meshingly engage the first and second plurality of teeth changes in response to rotation of the wave generator.

14. The seat assembly of claim 13, wherein the third plurality of teeth urge the second plurality of teeth to align with the first plurality of teeth in the plurality of distinct regions in response to rotation of the wave generator, thereby causing said rotation of the second plate relative to the first plate.

15. The seat assembly of claim 14, wherein the flex spline does not rotate relative to the first plate in response to rotation of the wave generator.

16. The seat assembly of claim 11, wherein the first plate is circular and the first plurality of teeth extend radially inwardly toward the pivot axis, and wherein the second plate is circular and the second plurality of teeth extending radially inward toward the pivot axis, and wherein the flex spline is circular and disposed axially between the first plate and the second plate and wherein the third plurality of teeth extend radially outwardly away from the pivot axis for meshed engagement with the first and second plurality of teeth.

17. The seat assembly of claim 11, further including an input shaft coaxial with the pivot axis, the input shaft coupled to the wave generator for rotating the wave generator about the pivot axis.

18. A wave generator for a disc recliner operatively coupling a seat back to a seat cushion to allow selective pivotal movement of the seat back relative to the seat cushion about a pivot axis extending in an axial direction, the wave generator comprising:
- a first plate, the first plate including a first plurality of teeth disposed therearound;
- a flex spline including a flexible wall having a second plurality of teeth disposed therearound, wherein a tooth count of the second plurality of teeth equals the tooth count of the first plurality of teeth;
- a cam having a plurality of spaced apart lobes extending outwardly in a radial direction defining a cam outer profile, the cam rotating about a pivot axis;
- a disc-shaped cage having an inner rim defining an opening for receiving the cam, an opposite outer rim having a plurality of spaced apart U-shaped recesses formed therein opposite the inner rim and extending around the perimeter of the cage; and
- a plurality of rollers rotatably and slidably received in and supported by the plurality of U-shaped recesses, the plurality of rollers repositionable within the plurality of U-shaped recesses towards the flex spline by direct contact with the plurality of spaced apart lobes;
- wherein rotating the cam repositions the plurality of rollers within the U-shaped recesses with the rollers aligned with the lobes repositioned towards the flex spline causing a portion of the second plurality of teeth to meshingly engage with the first plurality of teeth.

19. The wave generator of claim 18, wherein each of the plurality of rollers includes first and second wheels spaced apart in the axial direction and interconnected by a shaft, the shaft having an axis generally parallel to the pivot axis and rotatably supported in a respective U-shaped recess.

20. The wave generator of claim 19, wherein the wave generator further includes a pair of disc-shaped roller bearing plates seated on each opposite axial end of the plurality of rollers for supporting the plurality of rollers axially therebetween while allowing the plurality of rollers to rotate and move radially and thereby maintain contact between the outer profile of the cam and the flexible wall of the flex spline.

* * * * *